June 6, 1944.  C. R. BROWN  2,350,721

GREENHOUSE

Filed Sept. 19, 1942

INVENTOR.
CLIFFORD R. BROWN

BY Richey & Watts
ATTORNEYS

Patented June 6, 1944

2,350,721

UNITED STATES PATENT OFFICE 2,350,721

GREENHOUSE

Clifford R. Brown, Berea, Ohio

Application September 19, 1942, Serial No. 458,961

8 Claims. (Cl. 47—17)

This invention relates to greenhouses, and more particularly to apparatus for sterilizing the soil in greenhouses.

In greenhouses used for the cultivation of tomatoes and other vegetables, it has been found that various diseases to which the plants are subject are apt to remain in the soil and infect successive crops unless the soil is thoroughly sterilized from time to time. The usual method of sterilizing is to heat the soil with steam to a temperature sufficiently high to destroy the germs. Many problems have been encountered in attempting to sterilize large greenhouses with steam, such as difficulty in raising all parts of the soil bed to the necessary temperature, and the danger of excessively soaking some parts of the soil with moisture condensed from the steam.

It has been customary to lay tile or other pipe below the bed of top soil and, when it is desired to sterilize the ground, to connect this piping to a source of steam. The upper surface of the ground is ordinarily first covered with mulch paper and the steam is allowed to continue to flow through the piping and escape into the soil until all parts of the soil have been raised to the requisite temperature. Ordinarily, the steam is injected into the pipes at low velocity and rises first through the portions of the soil nearest the header and gradually spreads out through the entire soil bed. The result is that excessive time is consumed in waiting for the steam to reach the most remote portions of the bed, and the excess steam which rises through the nearest portions of the bed condenses and excessively soaks that portion of the soil. Thus further time is lost in drying out the portion of the soil bed which receives an excess of steam.

The principal object of this invention is to distribute sterilizing steam throughout all portions of a soil bed substantially simultaneously so as to sterilize the entire bed in a minimum length of time with a minimum amount of steam, and to maintain the condensation uniform throughout the entire bed. Another object is to inject steam into one end of a length of tile provided with outlets throughout its length in such a manner as to fill the entire length of tile with steam and distribute the same uniformly between the various outlets. Other objects and advantages will appear in the following detailed description of the preferred embodiment of the invention.

Figure 1:
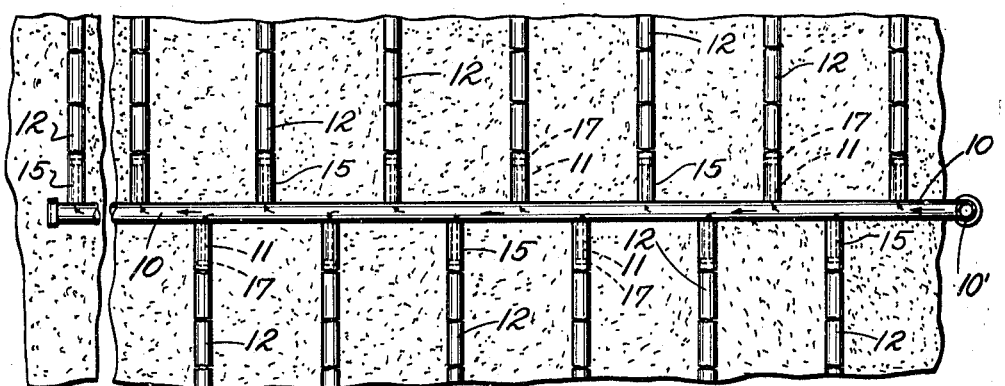
Fig. 1 is a plan view of a system of piping to distribute steam through a soil bed in accordance with this invention, the soil being removed to show the piping.

Referring to the drawing, the steam piping arranged in accordance with this invention is preferably laid in a layer of slag or gravel disposed below the bed of top soil in a greenhouse or the like. A metal pipe 10 is preferably used as a header and is connected to the boiler in any conventional way as by the vertical pipe 10'. At suitable intervals short outlet pipes 11 are connected to the header 10. These outlets 11 extend horizontally out from the header 10 on opposite sides as indicated in Fig. 1. The diameter of the outlet pipes 11 is sufficiently smaller than the diameter of the header 10 so that the sum of the areas of all of the outlets connected to a single header is about equal to the area of the header. In this way the header can maintain the steam pressure throughout its length and supply all of the outlet pipes uniformly. For example, I have found that a standard 2½" header will handle satisfactorily twenty-seven outlets of standard ½" pipe.

Figure 2:
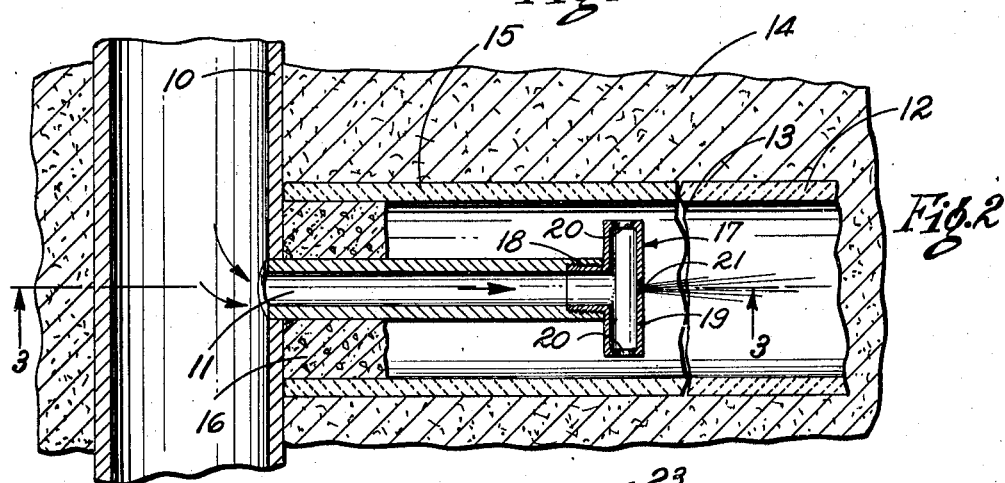
Fig. 2 is a horizontal section through the header pipe and the inlet end of one length of tile illustrating the steam injector.

Leading horizontally from the header are a series of conduits 12, which are perforate, or formed with spaced openings in any desired manner. In the illustrated embodiment the conduits consist of a pipes made up of standard short sections of tile with unfinished ends abutted against each other as indicated in Fig. 2. The small irregularities on the abutting ends of the tile sections form spaces indicated at 13 through which steam may escape into the slag or gravel 14 surrounding the tile. The first section of tile 15 in each line surrounds one of the outlet pipes 11 and is sealed to the outlet pipe and to the header 10 by any suitable cement 16. Thus steam from the outlet pipe 11 is prevented from escaping immediately adjacent the header 10.

A nozzle 17 is fastened to the end of each outlet pipe 11. Each nozzle includes a short threaded portion 18 to fit into the end of the outlet pipe 11, and a cross member 19 extending across the threaded portion 18 in the form of a T. The ends of the cross member 19 are formed with apertures 20, and a smaller aperture 21 is formed in the forward face of the cross member 19 in alignment with the axis of the threaded portion 18. As illustrated in Fig. 2 the outlet pipes 11 are preferably shorter than the first tile section 15 so that the openings 20 are directed radially toward the inner wall of the first tile section 15. The cross member 19, as shown in Fig. 2, is shorter than the internal diameter of the tiles so that the openings 20 are spaced a short distance from the inner wall of the first tile section 15.

In operation steam under moderate pressure is admitted to the header 10 and immediately travels the full length of the header so as to escape substantially simultaneously through the various outlet pipes 11. I have found that a steam pressure of about 20 to 25 pounds in the header is preferable. The steam passing down each outlet pipe 11 escapes simultaneously through the two apertures 20 and the smaller aperture 21 into the interior of the tile. The tile is sufficiently larger than the outlet pipe 11 so that the steam escaping through the openings 20 expands immediately substantially to atmospheric pressure and, because it is directed radially against the inner wall of the tile section 15, immediately loses most of its velocity. At the same time a jet of steam escapes from the opening 21 and is directed axially down through the series of tile sections. The forward velocity of this steam carries it through the entire length of the series of tile sections and at the same time acts as a jet, or steam injector, to carry the steam escaping from the apertures 20 slowly along through the series of tile sections and adjacent the inner walls of the tiles. The main body of the steam, therefore, moves relatively slowly past the apertures 13 formed at the joints of each pair of tile sections and escapes through these apertures into the slag or gravel 14 surrounding the tile.

I have found this action can be effected, using ½" outlet pipes 11, by making the apertures 20 about ⅜" in diameter and the aperture 21 about ¼" in diameter. Thus the combined areas of the two apertures 20 exceeds the area of the pipe 11 so that the steam moves rapidly in the direction of the arrow in Fig. 2 through the pipe 11, and is accelerated at the junction of the threaded portion 18 and the cross portion 19 of the nozzle. The forward velocity thus imparted to the steam creates a rapidly moving jet escaping from the aperture 21 so that this steam has sufficient energy to quickly distribute the entire volume of steam throughout the length of each tile 12. At the same time, the energy of the main body of the steam escaping through the apertures 20 is dissipated, so that this steam readily escapes through the openings 13 at each joint between the tile sections. If it were attempted to inject all of the steam into the tile in an axially directed jet the energy of the steam would carry it rapidly to the end of the tile pipe 12 remote from the header and build up a pressure at that point, so that little if any steam would escape into the soil at the first few joints adjacent the header.

The effect of the action of the jets escaping from the apertures 20 and 21 is to expand a large volume of steam into the conduits 12 with the total energy of the steam divided between radial and axial components so that the total volume of the steam moves axially through the conduits at a much lower velocity than would result from the total energy of the steam. At the same time the steam is maintained immediately adjacent the inner surfaces of the conduits 12 so that in moving through the conduits the steam readily escapes from the apertures 13 at every point in the length of the conduits.

The headers 10 and tile conduits 12 may be arranged in any desired manner so as to underlie the soil bed to be treated. For example, in a greenhouse thirty feet wide by two hundred feet long, two thirty foot headers may be disposed across the width of the house, each being located about fifty feet from one end. The tile conduits 12 extending in each direction from each header may then be made about fifty feet long, thus covering the entire area of the house.

Figures 3, 4:
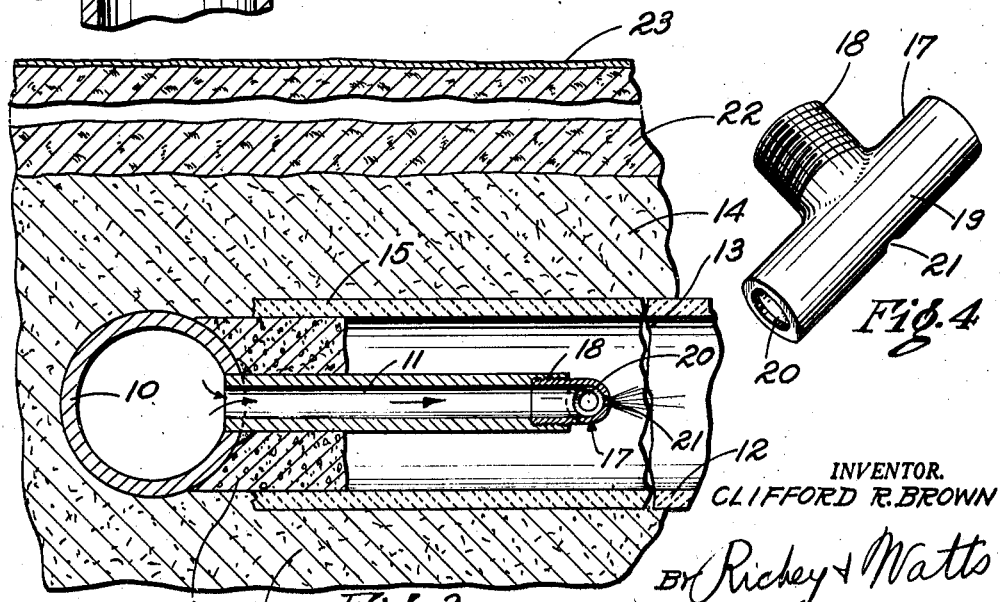
Fig. 3 is a vertical section taken on the line 3—3 of Fig. 2.
Fig. 4 is a perspective view of the steam injector nozzle detached from its pipe.

As illustrated in Fig. 3 the steam piping is preferably covered with slag or gravel 14 to a depth of a few inches and the top soil 22 of the desired depth is disposed above the slag 14. The usual drainage tiles (not shown) may be disposed in the slag below the steam piping. When the soil is being sterilized it is preferably covered with mulch paper 23. Thus the steam escaping from the openings 13 between the sections of tile is allowed to permeate the slag bed 14 at substantially atmospheric pressure and to rise through the bed of the top soil 22. By distributing the steam uniformly throughout the length of each of the tile pipes 12 the steam rises throughout the entire soil bed 22 substantially simultaneously. As soon as the temperature of the soil has been raised sufficiently high to sterilize it the steam may be shut off, thus avoiding the use of excessive quantities of steam or excessive condensation at any part of the soil bed. I have found that with this arrangement the time required for sterilizing a soil bed in a greenhouse may be reduced to less than half of that previously required.

Although the preferred embodiment of the invention has been described in considerable detail it will be understood that various modifications and re-arrangements of the part may be resorted to without departing from the scope of the invention as defined in the following claims.

I claim:

1. Means for sterilizing a soil bed comprising a header and a plurality of perforate outlet conduits extending therefrom and disposed beneath the soil bed, the sum of the cross sectional areas of said outlet conduits substantially exceeding the cross sectional area of said header, means for directing a jet of steam from said header into one end of each of said conduits and against a wall thereof, and means for directing another jet of steam from said header substantially axially into said one end of each of said conduits.

2. Means for sterilizing a soil bed comprising a header and a plurality of perforate outlet conduits extending therefrom and disposed beneath the soil bed, means for directing jets of steam from said header substantially radially with respect to said conduits into the ends of said conduits adjacent said header, and means for directing smaller jets of steam from said header substantially axially into said ends of said conduits.

3. Means for sterilizing a soil bed comprising a header and a plurality of perforate outlet conduits extending therefrom and disposed beneath the soil bed, the sum of the cross sectional areas of said outlet conduits substantially exceeding the cross sectional area of said header, pipes leading from said header into said conduits, each pipe having a nozzle opening for directing a jet of steam from said header into one of said conduits and against a wall thereof and a smaller nozzle opening for directing another jet of steam substantially axially into said one conduit at a point adjacent said first mentioned jet.

4. In a device of the class described, an elongated substantially straight perforate conduit and a pipe for admitting steam into one end of said conduit having a nozzle opening arranged to direct a jet of steam axially through said conduit and a larger nozzle opening arranged to direct a jet of steam into said conduit in a different direction and against the wall thereof at a point adjacent said first mentioned jet.

5. In a device of the class described, an elongated perforate conduit and means for admitting steam into one end of said conduit including a nozzle disposed within and spaced from said conduit and having an aperture directed radially into said conduit and a smaller aperture directed axially into said conduit.

6. In a device of the class described, a perforate tile conduit, a steam pipe extending into one end of said conduit, and a T on the end of said pipe having a nozzle opening in the center to direct a jet of steam axially into said conduit, and nozzle openings at the ends of the cross member of the T to direct jets of steam radially into said conduit.

7. Means for sterilizing a soil bed comprising a perforate, substantially straight tile conduit buried in the soil bed, a steam pipe substantially smaller than the conduit extending into one end of the conduit and spaced from the walls thereof, said steam pipe terminating in a nozzle disposed adjacent said one end of the conduit, said nozzle being formed with an opening arranged to direct a jet of steam against the wall of said conduit adjacent said one end thereof, and a substantially smaller opening arranged to direct a jet of steam axially into said conduit toward the other end thereof.

8. In a device of the class described, a nozzle for injecting steam comprising a T-shaped fitting having an inlet bore adapted to be secured to the end of a steam pipe, the cross member of said T being formed with a cross bore, said T being formed with a discharge opening extending through the wall of the cross member of the T and axially aligned with said inlet bore, said discharge opening being smaller in cross section than the cross section of said cross bore and said T being formed with a discharge opening at each of the opposite ends of the cross member of said T, each being directed substantially perpendicular to the axis of said inlet bore and having a cross sectional area smaller than the cross sectional area of said cross bore and larger than the cross sectional area of said first mentioned discharge opening.

CLIFFORD R. BROWN.